United States Patent [19]

Bramblet

[11] Patent Number: 4,976,403

[45] Date of Patent: Dec. 11, 1990

[54] VALVE WITH METALLIC BELLOWS VALVE STEM SEAL

[75] Inventor: John W. Bramblet, Houston, Tex.

[73] Assignee: Rockford Controls Corporation, Houston, Tex.

[21] Appl. No.: 465,492

[22] Filed: Jan. 16, 1990

[51] Int. Cl.$^5$ .................. F16K 31/50; F16K 31/528; F16K 31/54; F16K 41/10

[52] U.S. Cl. .................................. 251/214; 74/104; 74/109; 74/424.8 VA; 251/58; 251/129.01; 251/250; 251/266; 251/315; 251/335.3; 277/200

[58] Field of Search ........................ 251/58, 59, 129.01, 251/214, 229, 250, 266, 315, 335.3; 74/104, 109, 424.8 VA; 277/200

[56] References Cited

U.S. PATENT DOCUMENTS

| 1,644,825 | 10/1927 | Fulton | 251/335.3 |
| 3,096,966 | 7/1963 | McFarland, Jr. | 251/335.3 |
| 3,184,214 | 5/1965 | King | 251/229 |
| 3,532,320 | 10/1970 | Fisch | 251/315 |
| 3,787,023 | 1/1974 | Shufflebarger | 251/335.3 |
| 4,231,545 | 11/1980 | Nelimarkka | 251/335.3 |
| 4,399,977 | 8/1983 | Wheatley | 251/315 |
| 4,634,094 | 1/1987 | Geiser | 251/229 |
| 4,763,874 | 8/1988 | Ogawa | 251/214 |

FOREIGN PATENT DOCUMENTS

| 3723835 | 1/1989 | Fed. Rep. of Germany | 251/335.3 |
| 95535 | 4/1921 | Switzerland | 251/250 |

Primary Examiner—George L. Walton

[57] ABSTRACT

A fire-resistant valve 10 with a valve stem 40 mounted for linear motion through a valve stem bore 41 in the valve body 12 and connected to a valve element 20 by a connection means which effects movement of the valve element 20 between its valve open and its valve closed positions in response to axial linear motion of the valve stem 40. The valve includes a valve stem actuator 46 and a valve stem seal assembly comprising a primary seal in the form of an axially extensible and compressible metallic bellows 50 disposed in sleeved relation to the valve stem 40. The bellows is connected at one end by an annular weld 41 to the valve stem and at its other end by an annular weld 52 to the valve body in encircling relation to the valve stem and valve stem bore so as to effect a fluid-tight, gas-tight seal therebetween. A packing structure mounted in the annulus between the valve stem and wall of the valve stem bore provides a secondary valve stem seal.

4 Claims, 2 Drawing Sheets

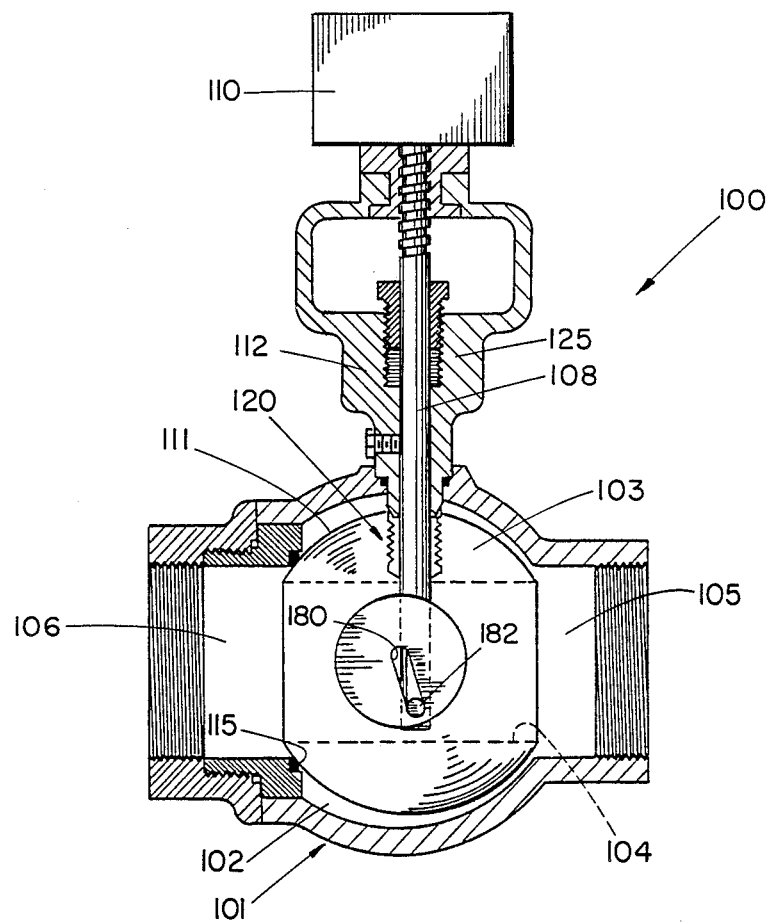
FIG. 3
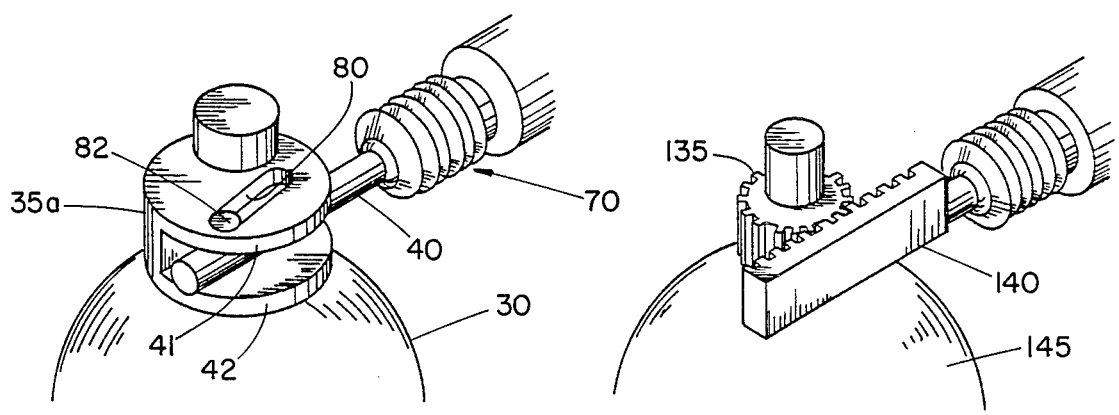
FIG. 4
FIG. 5

VALVE WITH METALLIC BELLOWS VALVE STEM SEAL

FIELD OF THE INVENTION

This invention relates to valves and more particularly to a valve having a linear motion valve stem and valve stem sealing means which particularly adapts the valve for use in critical service applications.

BACKGROUND OF THE INVENTION

For valves in critical service applications it is usually very important that the valve does not leak to the environment, particularly where toxic gases or other fluids which may be especially harmful are involved. Such leakage frequently occurs between the valve stem and valve bonnet and may be the result of destruction of the valve stem seal from such causes as unusually high pressures or temperatures as are associated with a fire, corrosive attack on the seal from the effluent flowing through the valve, or the gradual degradation of the seal from repeated valve cycling as might be due to galling of the valve stem or the valve stem bore by interaction with metallic packing rings or the erosion of the sealing surfaces of the valve stem packing from repeated use which is a common failure associated with rotary motion valve stems.

The various stem packing materials and packing assemblies which have been conventionally used with valves for critical service applications have not proven to be entirely satisfactory in all respects. Graphite and asbestos, which have been extensively used with "fire-safe" valves, do not generally provide for a long cycle life and asbestos itself may also be a hazard to the environment. Polytetrofluoroethylene and other plastic materials are widely used as packing materials but the application of high pressure to plastic packings tends to severely extrude the packing so that it is either dissipated or functionally invalidated. The sealing capabilities of these materials can also be severely degraded by erosion of their sealing surfaces by repeated cycling of the valve stem or by structural degradation of the packing by exposure to high temperature fluids or the elevated temperatures associated with a fire. Many packing arrangements include metallic rings, but these frequently lead to galling of the sealing surfaces and a loss of sealing capability.

SUMMARY OF THE INVENTION

A fire-resistant valve is provided which is uniquely adapted for use in critical service applications where leakage of toxic gases or other fluids which may be harmful to the environment is especially to be avoided. The valve comprises a valve body having a flow passage therethrough, a valve element mounted for movement between an open position and a closed position relative to the flow passage, and a linear motion valve stem for effecting movement of the valve element between the open and closed positions. The valve is provided with a valve stem-to-valve element connection means which effects movement of the valve element between its valve open and valve closed positions in response to linear motion of the valve stem as controlled by a valve stem actuator. The valve further includes a fire-resistant valve stem seal assembly which comprises a primary seal in the form of an axially extensible and compressible metallic bellows disposed in sleeved rotation to the valve stem and connected at one end by an annular weld to the valve stem and at its other end by an annular weld to the valve body in encircling relation to the valve stem and valve stem bore so as to effect a fluid-tight seal therebetween. A packing structure mounted in the annulus between the valve stem and wall of the valve stem bore provides a secondary valve stem seal.

BRIEF DESCRIPTION OF THE DRAWINGS

FIG. 3 is a sectional view of a second embodiment of the invention in the form of a ball valve equipped with a conventional actuator for imparting linear motion to the valve stem and rotary movement of the valve element to open or close the valve;

FIG. 4 is an enlarged fragmentary perspective view showing details of a scotch yoke type connection of a valve stem and valve plug element which may be used in the invention; and FIG. 5 is a fragmentary perspective view showing details of a rack and pinion type connection of a valve stem and valve element which may also be used in the invention.

DETAILED DESCRIPTION OF THE INVENTION

Figure 1:
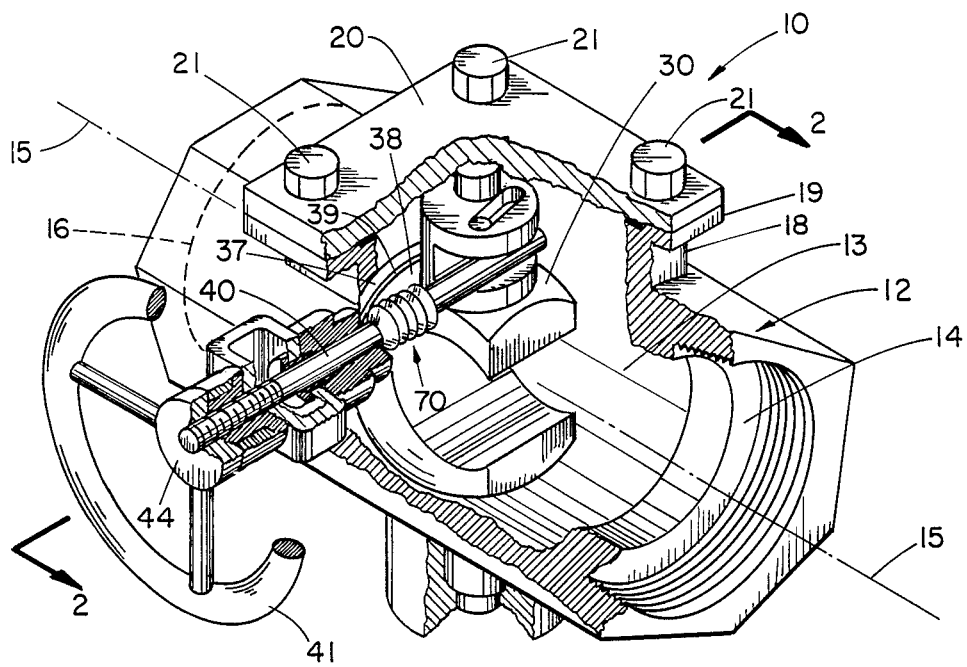
FIG. 1 is a perspective view of an embodiment of the invention in the form of an eccentric plug valve, parts of which are broken away, to show the unique valve stem sealing assembly and valve stem valve plug connection of the invention.

Referring more particularly to the drawings, there is shown in FIG. 1, a valve 10 of the eccentric plug valve type, part of which is cut away in the drawing to show details of the valve. The valve 10 comprises a valve body 12 with a valve chamber 13 defined therein. The valve body 12 is provided with an inlet port 14 and an outlet port 16 formed identically thereto which are in fluid communication with the valve chamber 13 and aligned therewith along an axis 15 to provide a flow passage through the valve. The ports 14,16 are internally threaded for facilitating connection of the valve 10 in a pipe line provided with accommodating external threads. However, the valve body 12 could also be welded into the pipeline or provided with end flanges for making flanged connections to the pipeline.

The valve body 12 is further provided with a tubular extension 18 which extends transversely with respect to the flow passage through the valve and is provided at its outer end with an external annular flange 19. A valve bonnet 20 is bolted to the annular flange 19 by means of bolts 21 and closes the opening to the valve chamber provided by the tubular extension 18. An annular seal 23 seated in an accommodating annular groove in the end of the tubular extension 18 is clamped by the bonnet 20 and provides a fluid-tight, gas-tight seal between the bonnet 20 and the valve body 12.

Figure 2:
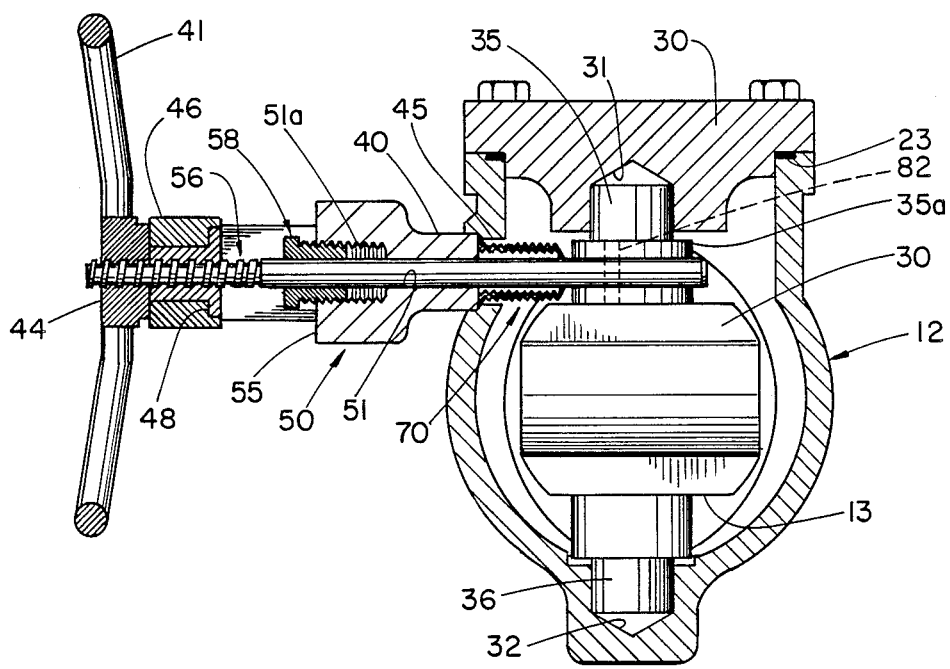
FIG. 2 is a sectional view of the valve of FIG. 1 as taken along the section line 2—2 in FIG. 1.

As best seen in FIG. 2, the valve bonnet 20 and valve body 12 are formed respectively with trunnion bores 31,32 which are aligned on an axis in intersecting relationship with the flow axis 15. A plug valve element 30 having upper and lower alignment trunnions 35,36 is rotatably mounted within the valve chamber 13 by means of the trunnions 35,36 which are respectively received in the trunnion bores 31,32. In the valve 10, the plug valve element 30 is an eccentric plug valve element, having a general "C" shape in vertical cross section and being provided with a central opening of corresponding configuration and dimension to the flow passage defined by the valve ports 14,16. The valve element 30 is formed with an external sealing surface 38 configured as a portion of a sphere generated about a point which is located eccentrically with respect to the axis of the trunnions 35,36.

The valve element 30 is adapted to be rotated between open and closed positions with respect to the flow passage by a valve stem 40 which interconnects therewith by means to be hereinafter described and an actuator, such as a handwheel 41 affixed to the valve stem 40. The valve body 12 is provided with an opening 45 through which the valve stem 40 is received and extends therethrough for connection with the valve element 30. In the closed position of the valve as shown in FIG. 1, the sealing surface 38 of the valve element 30 is in sealing engagement with a sealing ring 39 which is seated in a seat ring 37 having an accommodating annular groove (not shown) which encircles the flow passage through the valve.

A tubular valve stem adapter 50 having a central valve stem bore 51 extending therethrough is mounted to the valve body 12 by a fluid-tight annular weld connection, with its bore 51 aligned with the opening 45 in the valve body. The bore 51 includes an enlarged diameter section 51a in which a valve stem packing assembly 55 is received. The packing assembly 55 is shown to comprise a plurality of stacked packing rings formed of suitable packing material, such as plastic having desirable sealing properties which enable the packing to sealingly contact the metal valve stem 40 and the smooth wall defining the bore section 51a of the adapter 50. The bore section 51a is provided with internal threads in its outer portion for receiving a packing gland 58 which is threaded therein to a position which compresses the packing assembly 55 into sealing engagement with the valve stem 40 and the valve adapter 50. The gland flange might also be used for such purposes.

The central portion of the adapter 50 is formed with an opening 56 which extends transversely therethrough and provides access to the packing gland 58 and allows for its adjustment in compressing the packing assembly 55. The outer end portion of the adapter 50 is formed with an internally threaded bore section 52 in alignment with the adapter bore 51. The internal threads of the bore section 52 threadedly engage the externally threaded end portion of the valve stem 40 which extends therethrough. The valve stem 40 is also provided with a handwheel 41 having a central hub 44 which is threaded on to the end of the valve stem adjacent the end of the adapter 50. A bearing sleeve 46, provided at one end with an internal annular shoulder 47, is disposed with its shoulder 47 in abutting engagement with an external annular shoulder 48 on the adapter 50 and at its other end engaged by the handwheel hub 44. By turning the handwheel 41, the valve stem 40 is driven in linear motion in an axial direction determined by whether the handwheel is rotated clockwise or counterclockwise. The valve stem 40 is prevented from rotations by its connection with the valve element 30.

The packing assembly 55 constitutes a secondary seal for the valve stem 40. A primary valve stem seal is provided by a tubular metallic bellows 70 which is sleeved about the valve stem 40 and attached thereto at one end by an annular weld. At its other end the bellows 70 is attached to the valve body 12 by an annular weld about the opening 45 in encircling relation to the valve stem 40. For ease of assembly, the annular weld may be made to the end of the adapter 50 rather than the valve body 12. The bellows 70, however, is axially expansible in response to linear motion of the valve stem 40 towards the valve body 12 and is axially compressible in response to linear motion of the valve stem 40 in a direction outwardly of the valve body 12.

The metallic bellows 70 therefore provides a fluid-tight, gas-tight valve stem seal for valves incorporating a linear motion valve stem. The bellows 70, a commercially available product, may be manufactured from such metals as stainless steel, titanium or INCONEL, a nickel alloy. Because it is metallic, the bellows 70 is fire resistant and able to provide an effective seal when operating in very high temperature conditions, even though the secondary packing seal may have been rendered inoperative.

The valve stem 40 is connected to the valve element 30 by a scotch yoke connection which translates linear movement of the valve stem 40 into a limited rotary movement of the valve element 30. The scotch yoke connection of the valve stem and valve element is shown in detail in FIG. 4. In this connection, an enlarged diameter portion 35a of the trunnion 35 is formed with a transverse opening which extends radially inward from the outer cylindrical surface of the trunnion to define a yoke with upper and lower yoke portions 41,42 which accommodate the valve stem 40 therebetween.

The upper and lower yoke portions 41,42 are each provided with an elongate linear slot 80 which extends generally non-radially with respect to the axis of the trunnion 35, although it may be made to extend radially. The valve stem 40 is provided with a pin 82 which extends transversely with respect to the axis of the valve through an accommodating bore provided in the valve stem and projects radially outward therefrom on opposite sides of the valve stem. The pin 82 is received in the slots 80 and is disposed in driving engagement with the walls of the slots 80. As seen in FIG. 1, linear motion of the valve stem 40 in a direction inwardly with respect to the valve body 12 will cause the pin 82 to interact with the walls of the slots 80 to cam the trunnion 35 in a counterclockwise direction and thereby rotate the valve element 30 by 90° from its valve closed position in FIG. 1 to a valve open position wherein the central opening of the valve element 30 is aligned with the valve ports 14,16. A stop, which limits the rotation of the valve element 30 to a range of 90° between valve closed and valve open position, is provided by the walls of the slots 80. However, if desired, an additional stop (not shown) may be provided in the interior of the valve body 12 to engage and limit the rotation of the valve element 30 or to engage the valve stem 40 in a manner which limits its range of axial movement.

In FIGS. 1 and 2, the invention is illustrated in the embodiment of an eccentric plug valve, but it is to be understood that the invention may be incorporated in the embodiment of other valve types, such as a ball valve or conventional plug valve. In FIG. 3, such a ball valve 100 is shown which includes a valve body 101 having a valve chamber 102 and a ball valve element 103 in a valve open position wherein a central opening 104 through the ball element 103 is aligned with valve inlet and outlet ports 105,106, respectively. The valve 100 includes a valve stem 108 connected to the valve element 102 by means of a scotch yoke connection with slot 180 and pin 182 substantially identical to the scotch yoke connection shown for the valve 10 in FIGS. 3 and 4. However, in lieu of a handwheel, the valve 100 is provided with an electrical, pneumatic or hydraulic actuator 110 of a conventional type which is adapted to impart linear motion to the valve stem 108 to move the valve element to a valve open or valve closed position. With reference to FIG. 3, it will be seen that a linear motion of the valve stem 108 outwardly of the valve chamber 102 will impart a counterclockwise rotation of the ball element 103 to a position wherein a spherical sealing surface 111 of the ball element 103 is in sealing engagement with the sealing ring 115 so as to close off the flow passage through the valve. A metallic bellows 120 is attached at one end by an annular weld to valve stem 108 and at its other end to the end of a valve stem adapter 112 which is installed in an opening in the valve body which accommodates valve stem 108. Preferably, the adapter is sealed to the valve body 101 by an annular weld connection. A secondary valve stem seal is provided for the valve stem 108 in the form of a packing assembly 125 similar to the packing assembly 55 used with the valve 10 in FIG. 10.

An alternate type of connection for the valve stem and rotatable valve element which may be employed with the invention in lieu of the scotch yoke connection is a rack and pinion connection such as shown in FIG. 5. In this embodiment of valve stem connection, the trunnion 135 is formed as a pinion gear and the valve stem 140 is formed as a rack with teeth on one side thereof which cooperatively engage with the teeth of the pinion gear. Axial linear motion of the valve stem 140 will thereby effect a rotation of the pinion gear 135 and the valve element 145 connected thereto.

It will therefore be seen that a valve is disclosed herein which is provided with a unique valve stem sealing capability. The expansible, compressible metallic bellows which is designed for use with linear motion valve stems provides a gas-tight, fluid-tight seal which is fire-resistant, being able to operate effectively in elevated temperature when the valve may be exposed to a fire or is carrying fluids at very high temperatures. It also provides a valve stem seal with a very long cycle life, since it does not incorporate sealing surfaces which are in sliding or moving engagement during valve stem operation and are more likely to degrade.

It is also to be understood that the foregoing description of a preferred embodiment of the invention has been presented for purposes of illustration and explanation and is not intended to limit the invention to the precise form disclosed. For example, the invention may be incorporated in valves having a valve element other than an eccentric plug valve element or ball plug as, for example, a butterfly valve. The valve might also be built without a top bonnet. It is to be appreciated therefore, that various material and structural changes may be made by those skilled in the art without departing from the spirit of the invention.

I claim:

1. A valve comprising a valve body having a valve chamber formed therein and an inlet port and an outlet port provided in the valve body in communication with said valve chamber and defining therewith a flow passage through the valve body;

a valve element rotatively mounted in the valve body within said valve chamber for rotative movement about a first axis between a first position wherein said flow passage is open and a second position wherein said valve element closes said flow passage, said valve element being provided with a closure portion and trunnions on either side of said closure portion, said trunnions being aligned with said first axis and rotatively journalled in said valve body for accommodating rotary movement of said valve element about said first axis;

said valve body having a valve stem bore formed in the valve body in communication with said valve chamber and extending along a second axis disposed transverse to and offset with respect to said first axis;

a valve stem extending through said valve stem bore and arranged for axial linear motion in said valve chamber;

means for interconnecting said valve stem to one of said trunnions in said valve chamber whereby axial linear movement of said valve stem imparts rotary movement to said valve element for rotation between said first and second positions;

said means for interconnecting the valve stem to the valve element comprising a connection wherein one of said trunnions is provided with an elongate slot having side walls formed therein to extend in a direction transverse with respect to said trunnion journal axis, said valve stem being provided with a drive which projects therefrom in a direction transverse to the axis of the valve stem and is received within said elongate slot in driving engagement with a side wall of said slot whereby axial linear movement of the valve stem causes the drive to apply a moment force to the slotted trunnion about the journal axis and thereby impart rotary movement to said valve element in a direction to close or open said flow passage as controlled by the direction of axial linear movement of the valve stem;

actuator means on said valve body for imparting axial linear motion to said valve stem in a selected direction of axial movement in said valve chamber to either open or close said flow passage; and gas-tight seal means within said valve chamber for sealing the annulus formed in the valve stem bore between said valve stem and said valve body at said slotted trunnion, said seal means including a tubular metallic bellows disposed in sleeved relationship to said valve stem and connected at one end to said valve stem by an annular weld to effect a gas-tight connection therewith and connected at its other end in a welded relationship to said valve body and in encircling relation to said valve stem, said bellows being axially extensible in response to linear axial movement of the valve stem in one direction and being axially compressible in response to linear axial movement of the valve stem in the opposite direction.

2. A valve as set forth in claim 1 wherein said actuator means is a fluid-controlled actuator.

3. A valve as set forth in claim 1 and further including means for eccentrically mounting said trunnion portions in said valve body and where said closure portion on said valve element has a partially spherical sealing surface generated about a point located eccentrically relative to said first axis and where said valve body is provided with an annular seat surface encircling said flow passage, said annular seat surface being generated about the same point of eccentricity as said spherical sealing surface whereby said valve element spherical sealing surface is in sealing contact with said annular seat surface in the closed position of the valve element.

4. A valve as set forth in claim 1 wherein one of said trunnions is provided with a plurality of slots arranged as a pinon and said valve stem is provided with a plurality of projecting drive elements arranged as a rack in driving engagement with said pinion.

* * * * *